(12) United States Patent
Little et al.

(10) Patent No.: US 8,452,185 B2
(45) Date of Patent: May 28, 2013

(54) POLARIZATION INSENSITIVE OPTICAL CIRCUIT (75) Inventors: Brent E. Little, Glen Head, NY (US); Sai T. Chu, Columbia, MD (US)

(73) Assignee: Infinera Corporation, Sunnyvale, CA (US)

( * ) Notice: Subject to any disclaimer, the term of this patent is extended or adjusted under 35 U.S.C. 154(b) by 1183 days.

(21) Appl. No.: 11/963,633

(22) Filed: Dec. 21, 2007

(65) Prior Publication Data

US 2010/0296161 A1    Nov. 25, 2010

(51) Int. Cl.
*H04B 10/00* (2006.01)
(52) U.S. Cl.
USPC .......................................... 398/152; 398/180
(58) Field of Classification Search
USPC .................................................. 398/152, 180
See application file for complete search history.

(56) References Cited

U.S. PATENT DOCUMENTS

| | | |
|---|---|---|
| 4,085,335 A | 4/1978 | Guilino |
| 4,272,159 A | 6/1981 | Matsumoto |
| 4,464,022 A | 8/1984 | Emkey |
| 4,650,289 A | 3/1987 | Kuwahara |
| 4,859,014 A | 8/1989 | Schmitt et al. |
| 5,212,586 A | 5/1993 | Van Delden |
| 5,212,711 A | 5/1993 | Harvey et al. |
| 5,295,016 A * | 3/1994 | Van Deventer ............... 359/347 |
| 5,388,001 A | 2/1995 | Okayama et al. |
| 5,400,418 A | 3/1995 | Pearson et al. |
| 6,862,130 B2 * | 3/2005 | Batchko et al. ............... 359/326 |
| 2002/0163691 A1 | 11/2002 | Wong et al. |
| 2003/0058536 A1 | 3/2003 | Huang et al. |
| 2005/0111848 A1 * | 5/2005 | Grubb et al. .................. 398/147 |

FOREIGN PATENT DOCUMENTS

JP    01-182832    *   7/1989

OTHER PUBLICATIONS

Makiuchi et al., "Development of a Low-Loss Optical Circulator", *Furukawa Review*, (2002) No. 22, pp. 1-4.

* cited by examiner

*Primary Examiner* — Nathan Curs
(74) *Attorney, Agent, or Firm* — Dunlap Codding LLP; David L. Soltz (57) ABSTRACT The present invention, in one embodiment contemplates a polarization insensitive optical circuit constructed of an input/output signal separator, such as an optical circulator or a 1×2 or 2×2 coupler or N×M coupler, a polarization sensitive operator, and a polarization rotator reflector. In an alternate embodiment, the invention contemplates a polarization insensitive optical circuit comprising a polarization rotator reflector, and a polarization sensitive operator which may comprise for example a first polarization rotator, an operator/coupler, and a polarization beam combiner. Preferably at least one of the components in the optical circuit is constructed integrally from the substrate upon which the optical circuit is based. For example the polarization rotator and/or polarization sensitive operator of the present invention may be monolithic.

5 Claims, 6 Drawing Sheets

POLARIZATION INSENSITIVE OPTICAL CIRCUIT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates generally to polarization-insensitive optical circuits which have one or more polarization sensitive optical components.

Light is a vector field that has two primary and orthogonal polarization states or vector directions. Generally, the polarization states are referred to as the S and P polarizations in free space optics, or the TE (Transverse Electric) and TM (Transverse Magnetic) modes of optical waveguides. The performance of optical waveguides and optical devices is often sensitive to the polarization state. That is, the response of the device changes as the polarization state changes. This is particularly pronounced in integrated optical waveguides that are fabricated on dielectric substrates.

Many optical components are insensitive to the input state of polarization. In fiber optic telecommunications, the polarization state of an optical signal that has traveled down any length of fiber is unknown, random, and time varying (due to perturbations in the environment). However, many devices remain polarization sensitive to some degree, and this affects ultimate performance, yield, and cost. However, in many cases it is desirable to use polarization sensitive operators while maintaining an overall polarization independent optical circuit.

An apparatus and method for treating optical signals with polarization sensitive components while maintaining a polarization insensitive signal output, and which contain relatively non-complex structures and components are desirable.

DETAILED DESCRIPTION OF THE INVENTION

The present invention, in one embodiment contemplates a polarization insensitive optical circuit constructed of an input/output signal separator, such as an optical circulator or a 1×2 or 2×2 coupler, or N×M coupler, a polarization sensitive operator, and a polarization rotator reflector. In an alternate embodiment, the invention contemplates a polarization insensitive optical circuit comprising a polarization rotator reflector, and a polarization sensitive operator which may comprise for example a first polarization rotator, an operator/coupler, and a polarization beam combiner. Preferably at least one of the components in the optical circuit is constructed integrally in the substrate upon which the optical circuit is based. For example the polarization rotator and/or polarization sensitive operator of the present invention may be monolithic. Preferably both the polarization sensitive operator and polarization rotator of the invention are monolithic and more preferably, when included in the optical circuit, the polarization beam splitter and/or combiner is also monolithic.

Figure 1:
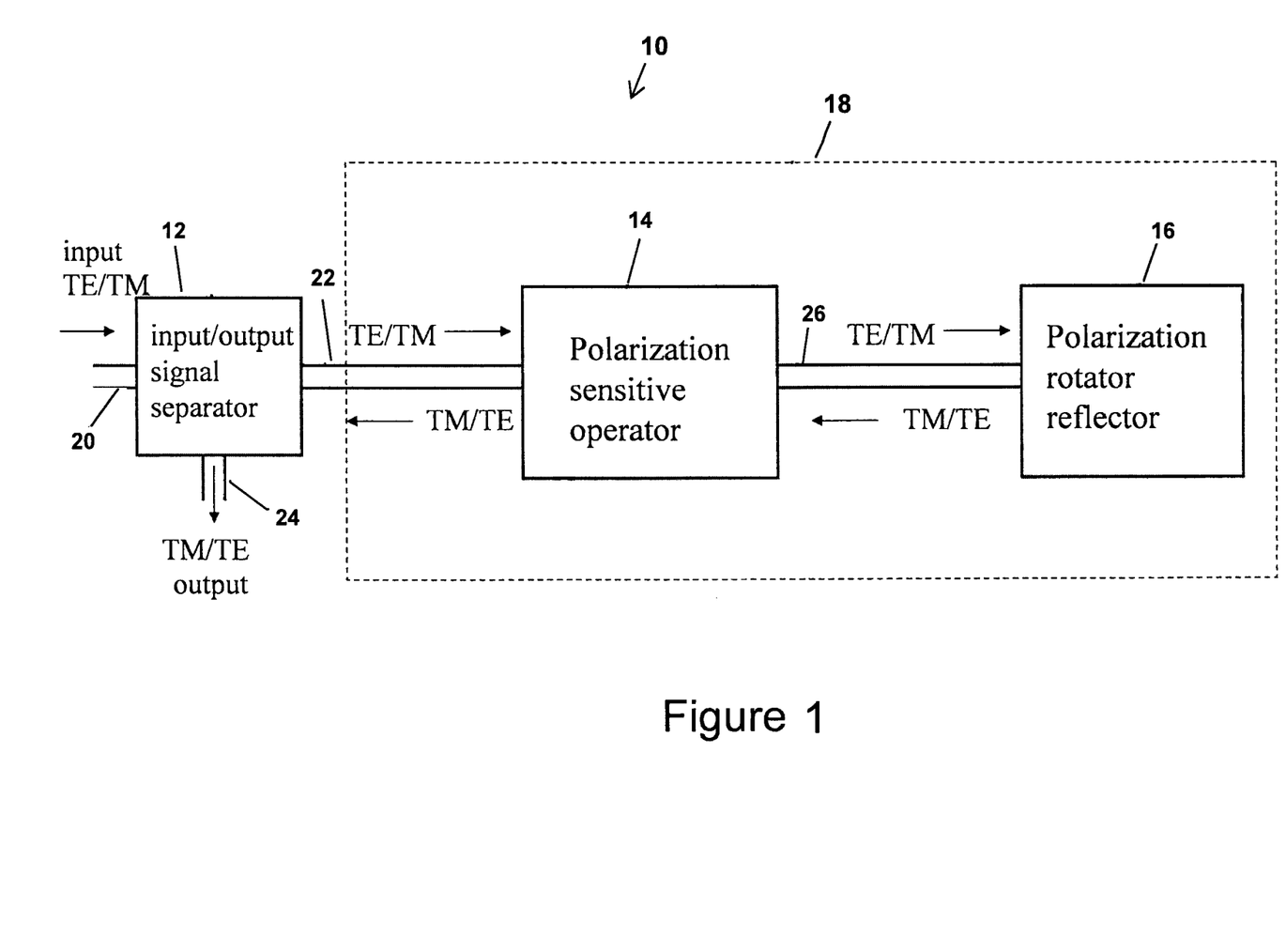
FIG. 1 is a schematic view of an optical circuit of the present invention comprising an input/output signal separator, a polarization sensitive operator, and a polarization rotator reflector.

Turning now to the drawings, shown in FIG. 1 is an optical circuit designated by the general reference number 10. The optical circuit 10 is constructed of an input/output signal separator 12, a polarization sensitive operator 14, and a polarization rotator reflector 16. The input/output signal separator 12 functions to separate a backward propagating output signal (or a portion thereof) from an input signal. The polarization sensitive operator 14 and polarization rotator reflector 16 are optionally integratively constructed as a monolithic pair of components as represented by integrated structure 18. However, any of the components in, alone or together, may be constructed as integrated, monolithic components or may be constructed as non-monolithic components. The input/output signal separator 12 has an input port 20, an intermediate port 22 and an output port 24. The intermediate port 22 is operatively connected to the polarization sensitive operator 14. The polarization sensitive operator 14 preferably comprises at least one of an amplitude filter, phase filter, variable optical attenuator, optical switch, demultiplexer, multiplexer, or combinations of the foregoing, or any element or operator known in the art which is not polarization independent. Light enters input port 20 as polarized light comprising both TE and TM modes and is gyrated or otherwise oriented or directed into intermediate port 22 of the input/output signal separator 12 which couples the polarized light signal into the polarization sensitive operator 14. The components of the polarized light signal are then acted on by the polarization sensitive operator 14, depending on the nature, construction and function of the polarization sensitive operator 14, then the treated light signal exits the polarization sensitive operator 14 via a port 26, wherein it enters the polarization rotator reflector 16 and wherein the TE mode of the light signal is rotated to the TM mode and the TM mode of the light signal is rotated to the TE mode. After rotation, or during rotation, the rotated light signal is reflected by the reflector component of the polarization rotator reflector 18 back into the port 26 wherein it reenters the polarization sensitive operator 14, wherein each rotated polarized component of the light signal is now treated by the polarization sensitive operator 14 during the second pass therethrough. It will be further understood that in accordance with the present invention the order of reflection and rotation can be reversed, or reflection and rotation can happen simultaneously so long as the signal exiting the reflector-rotator is orthogonal to the input signal.

After the second pass through the polarization sensitive operator 14, both the TE and TM components of the light signal have been treated by the polarization sensitive operator 14. The light signal then exits the polarization sensitive operator 14 through the intermediate port 22 into the input/output signal separator 12, then is output therefrom at output port 24 thereof.

The polarization sensitive operator 14 will in general operate on both the TE and TM polarization modes. After going through the polarization sensitive operator 14, and then being rotated and reflected back into polarization sensitive operator 14, the original TE component is now in a TM polarization state and will be operated on by polarization sensitive operator 14 in the TM polarization state, and similarly for the original TM polarization. Thus any light signal that is input into the optical circuit 10 is first operated on in one polarization mode, and then operated on in the orthogonal polarization mode following reflection and backward propagation. In this manner the optical circuit 10 is polarization insensitive in that any light signal is operated on both in its original polarization state, and then in its rotated orthogonal polarization state. All polarization states are composites of two orthogonal states, so any state is thus "equalized".

If desired, either immediately after being treated the second time by the polarization sensitive operator 14, or after being outputted from the output port 24, the light signal can be rotated again to restore the TM mode to the TE mode, and the TE mode to the TM mode. In one embodiment for example, the polarization sensitive operator 14 may be more sensitive to the TM mode than the TE mode. In this embodiment, the polarization sensitive operator 14 primarily treats the light in the TM mode in the first pass, while light in the TE mode is relatively unaffected. The light in the TE mode is then rotated by polarization rotator reflector 16 to the TM mode and is reflected thereby back through polarization sensitive operator 14 wherein the TM rotated light is then treated. Both TE and TM components of the light signal are thus treated before exiting from the output port 24 of the input/output signal separator 12. Further, it will be understood that the optical circuit 10 may function in the reverse direction as well, such that the light signal enters at output port 24 and exits at input port 20.

Figure 2:
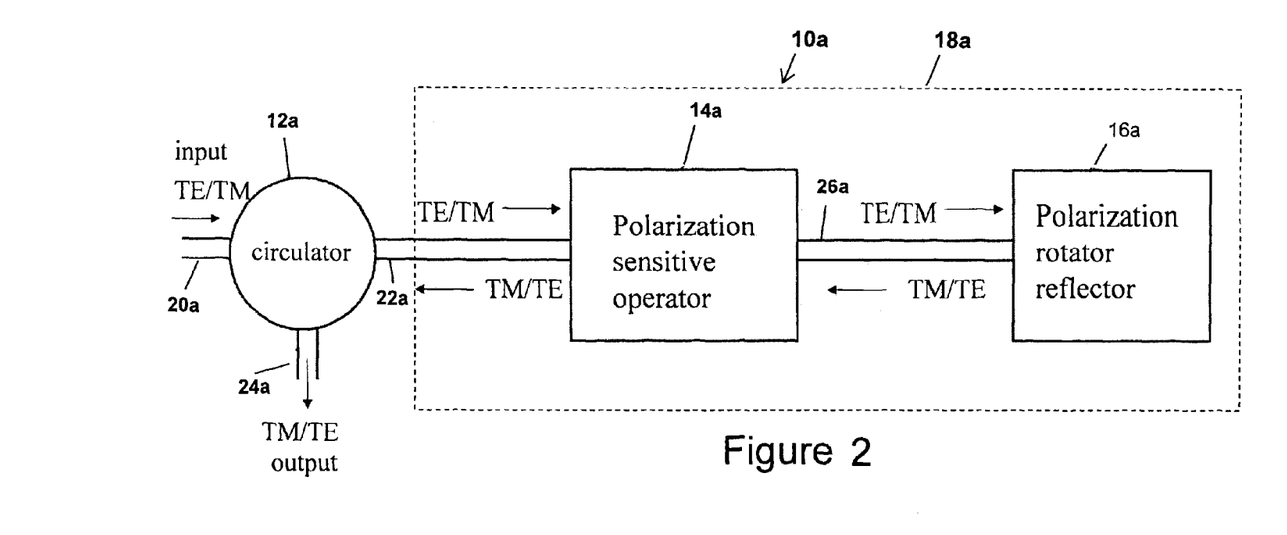
FIG. 2 is a schematic view of an embodiment of the optical circuit of FIG. 1 wherein the input/output signal separator is an optical circulator.

Shown in FIG. 2 is a particular embodiment of the invention of FIG. 1 comprising an optical circuit 10a which is similar to optical circuit 10 in having components 18a (which may be integrated) comprising polarization sensitive operator 14a, polarization rotator reflector 16a and intermediate port 26a. Optical circuit 10a differs from optical circuit 10 in having a circulator 12a which functions as the input/output signal separator. Circulator 12a further comprises an input port 20a, intermediate port 22a, and an output port 24a.

Figure 3:
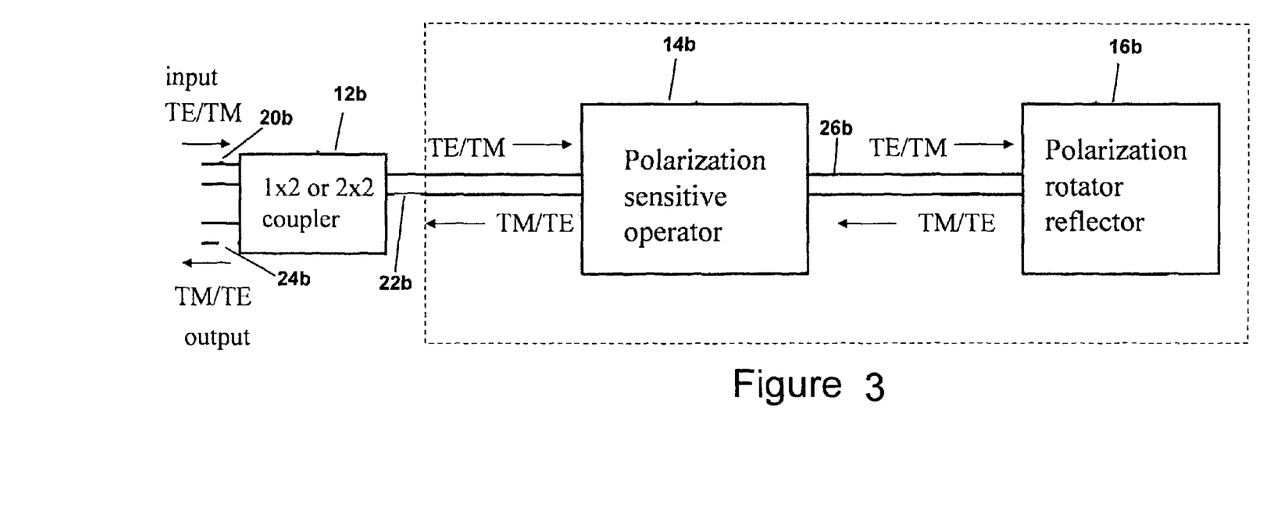
FIG. 3 is a schematic view of an embodiment of the optical circuit of FIG. 1 wherein the input/output signal separator is a 1×2 or 2×2 coupler.

Shown in FIG. 3 is another particular embodiment of the invention of FIG. 1 comprising an optical circuit 10b which is similar to optical circuit 10 in having components 18b (which may be integrated) comprising polarization sensitive operator 14b, polarization rotator reflector 16b, and intermediate port 26b. Optical circuit 10b differs from optical circuit 10 in having a 1×2 or 2×2 coupler which functions as the input/output signal separator. The 1×2 or 2×2 coupler 12b further comprises an input port 20b, an intermediate port 22b and an output port 24b. In alternate embodiments N×M couplers may be used in lieu of 1×2 or 2×2 couplers.

Figure 4:
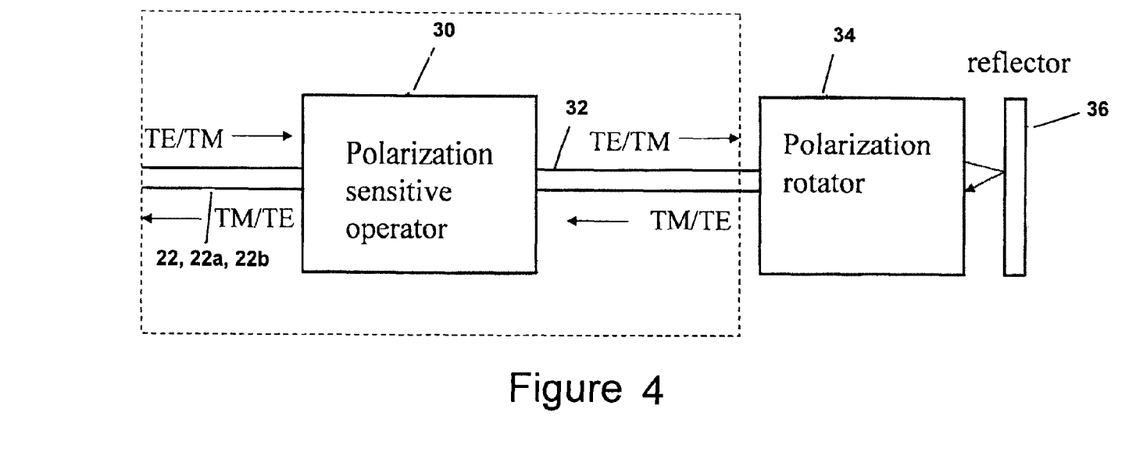
FIG. 4 is a schematic view of an embodiment of the optical circuit of FIG. 1 wherein the polarization rotator reflector comprises a polarization rotator and a reflector.

In an alternate embodiment of the invention, shown in FIG. 4, the components 18, 18a and 18b of the optical circuit 10, 10a and 10b have been replaced with a polarization sensitive operator 30 (which optionally is monolithic) having a port 32 which couples the light signal into a polarization rotator 34, which orthogonally rotates the light signal as explained earlier, then to a reflector 36, which causes backward propagation (reflection) of the rotated light signal back into the port 32 and thereby into the polarization sensitive operator 30. In this embodiment the polarization rotator 34 and reflector 36 are not necessarily monolithic, although optionally in an alternate embodiment, the polarization rotator 34 or the reflector 36, or both, may be monolithic (and even for example, the polarization sensitive operator 30 may be non-monolithic).

Figure 5:
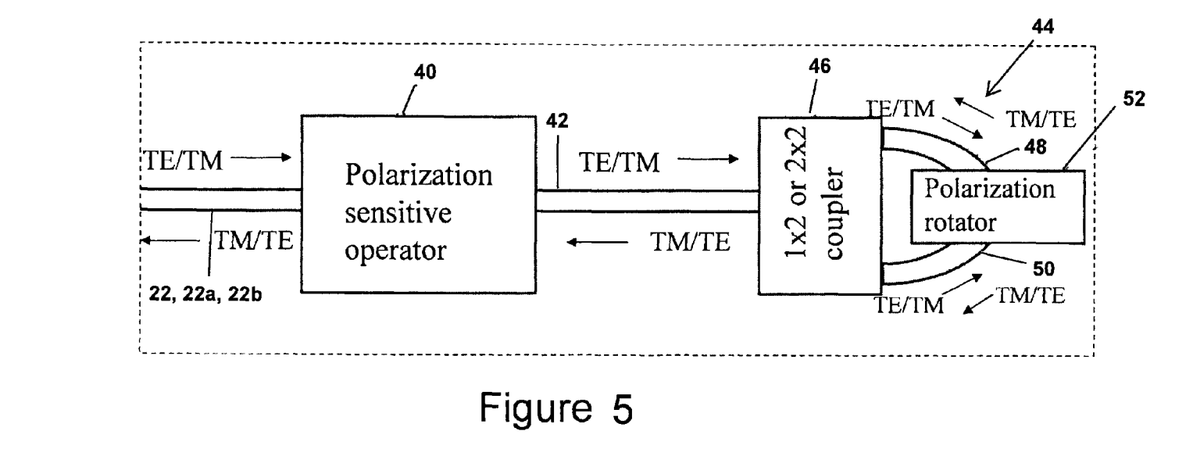
FIG. 5 is a schematic view of an embodiment of the optical circuit of FIG. 1 wherein the polarization rotator reflector comprises a 1×2 or 2×2 coupler and a polarization rotator.

In an alternate embodiment of the invention, shown in FIG. 5, the components 18 of the optical circuit 10, 10a, or 10b are replaced with a polarization sensitive operator 40 (which is optionally monolithic) having a port 42 which couples the light signal into a rotating loop reflector 44 comprising a 1×2 or 2×2 coupler 46 which in turn couples the light signal via either a first port 48 and a second port 50 into a polarization rotator 52. The light signal, after passing through the polarization rotator 52 wherein the TE mode is rotated to the TM mode (and the TM mode is rotated to the TE mode) is then returned to the polarization sensitive operator 40 via the port 42. In the embodiment shown in FIG. 5 the 1×2 or 2×2 coupler 46 and the polarization rotator 52 are monolithic although in an alternate embodiment either one or both may be non-monolithic (even, for example, when the polarization sensitive operator 40 is non-monolithic).

Figure 6:
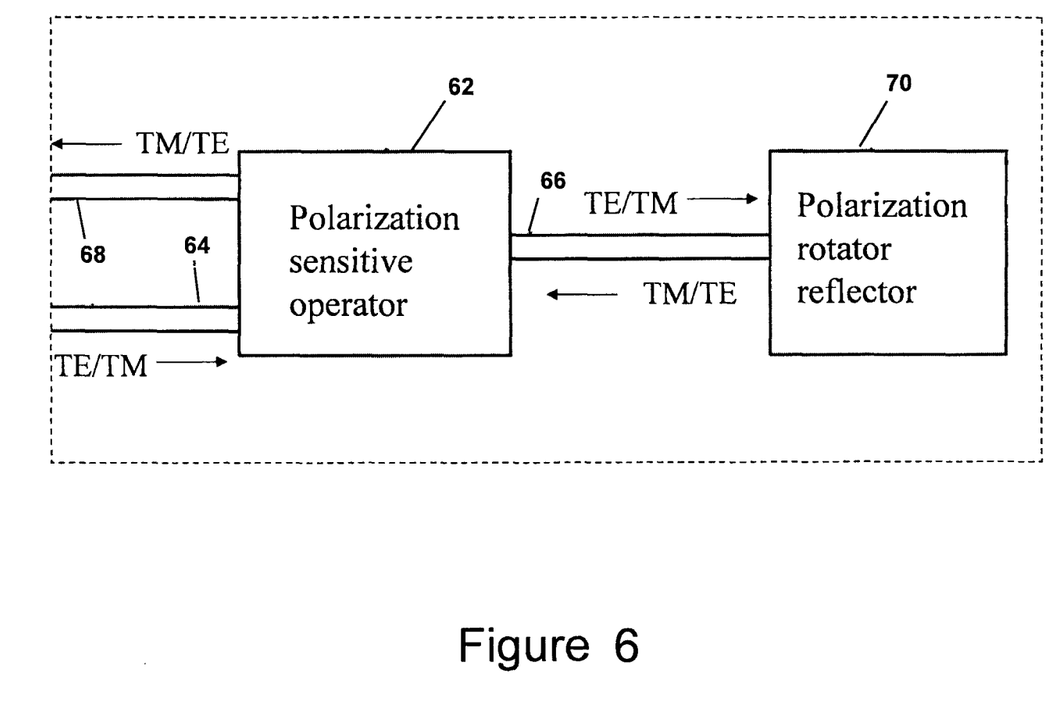
FIG. 6 is a schematic view of an optical circuit of the present invention which comprises a polarization sensitive operator and polarization rotator reflector.

An alternative embodiment of the invention is represented in FIG. 6 as a polarization insensitive optical circuit 60 which is constructed of a polarization sensitive operator 62 having an input port 64, and intermediate port 66, and an output port 68. The intermediate port 66 is operatively connected to a polarization rotator reflector 70. The polarization sensitive operator 60 is similar to the polarization sensitive operators described above except that it has two physically separate input and output ports (64 and 68), instead of a single port which functions as both an input port and an output port (e.g., port 22 of FIG. 1).

Figure 7:
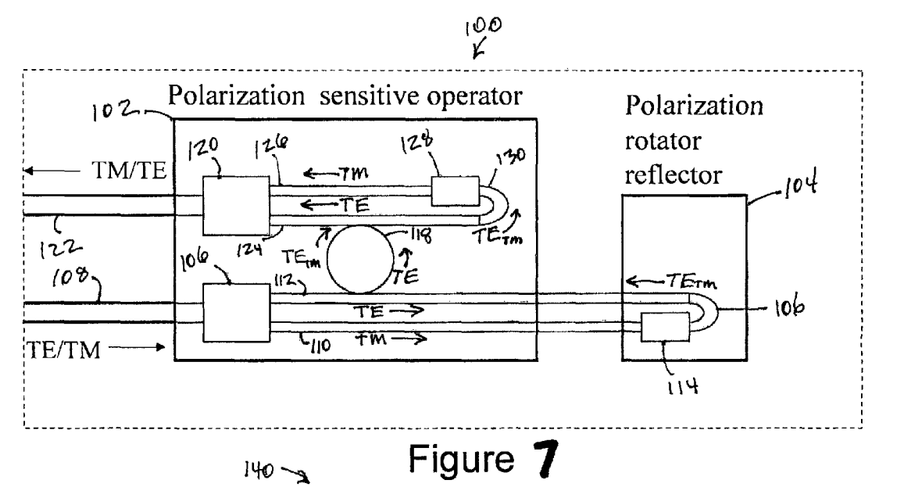
FIG. 7 is a schematic view of an embodiment of the optical circuit of FIG. 6 wherein the polarization sensitive operator comprises a polarization beam splitter, an operator/coupler, a polarization rotator, and a polarization beam combiner.

In one embodiment, shown in FIG. 7, a polarization insensitive optical circuit 100 is constructed of a polarization sensitive operator 102 and a polarization rotator reflector 104. The polarization sensitive operator 102 is constructed of a polarization beam splitter 106 having an input port 108, a first output signal path 110, and a second output signal path 112. The first output signal path 110 is operatively connected to and serves as an input for a first polarization rotator 114 of the polarization rotator reflector 104. The first polarization rotator 114 has an output port 116 which leads into the second output signal path 112. Also operatively associated with the second output signal path 112 is a polarization sensitive operator/coupler 118 into which the optical signal from the second output signal path 112 becomes coupled as it passes through the second output signal path 112. The operator/coupler 118 may be, for example, an optical element which acts on a particular mode or frequency of the optical signal.

For example the operator/coupler 118 may comprise an amplitude filter, phase filter, variable optical attenuator, optical switch, demultiplexer, multiplexer, or combinations of the foregoing. The polarization sensitive operator 102 is further constructed of a polarization beam combiner 120 having an output port 122 leading therefrom for outputting a signal, and a first input signal path 124 and a second input signal path 126 leading into the polarization beam combiner 120. The operator/coupler 118 is operatively coupled with the first input signal path 124 which is also operatively connected to a second polarization rotator 128 via an input port 130. The second polarization rotator 128 is in turn operatively connected to the polarization beam combiner 120 via the second input signal path 126.

In operation, an optical signal preferably comprising both TE and TM modes is input into the polarization beam splitter 106 via input port 108, wherein the optical signal is split substantially into separate signals, a first signal comprising substantially only light in the TM mode which enters the first output signal path 110, and a second signal comprising substantially only light in the TE mode, which enters the second output signal path 112. The first signal, in the TM mode, enters the first polarization rotator 114 wherein it is rotated substantially into the TE mode, the rotated first signal being represented in FIG. 7 as $TE_{TM}$ exiting the output port 116 of the first polarization rotator 114. The $TE_{TM}$ signal travels through the second output signal path 112 where it is coupled into the operator/coupler 118 and acted on by the operator component therein, then coupled into the first input signal path 124 in the direction toward and entering the second polarization rotator 128 via the input port 130. The $TE_{TM}$ signal which enters the second polarization rotator 128 is then rotated back into the TM mode and therefrom into the second input signal path 126 where it is input into the polarization beam combiner 120. The TE component of the first signal, is transmitted through the second output signal path 112, upon exiting the polarization beam splitter 106 and is coupled into the operator/coupler 118 where it is acted on by the operator component therein. For example, signals entering the operator/coupler 118 from the second output signal path 112 are either both in the TE mode (as TE and $TE_{TM}$) or both in the TM mode (as TM and $TM_{TE}$). The light signals are thus acted on in the operator/coupler 118 in substantially the same polarization mode. The TE mode component of the signal after being acted on by the operator/coupler 118 is coupled into the first input signal path 124 and travels in the direction toward and into the polarization beam combiner 120, where it, and light in the TM mode from the second input signal path 126 is recombined into a single optical signal comprising both TE and TM modes and which exits via output port 122, both signal TE and TM components having thus been acted on by the polarization sensitive operator/coupler 118, such that the optical circuit 100, taken in its entirety comprises a polarization insensitive (independent) optical circuit. The polarization insensitive optical circuit 100 is constructed without an input/output signal separator since the optical signal, after entering the polarization beam splitter 106 and being operated upon by the operator/coupler 118 is output via the polarization beam combiner 120. It will be understood by a person having ordinary skill in the art that a light signal can travel in a direction opposite to that shown in FIG. 7 such that the functions of the polarization beam splitter 106 and the polarization beam combiner 120 are reversed. Similarly, the first and second polarization beam rotators 114 and 128, respectively, may be constructed such that they specifically rotate the TE mode to TM, and TM to TE, respectively. Alternatively, the first polarization beam rotator 114 can be placed in the second output signal path 112 before the operator/coupler 118, rather than in first output signal path 110. Likewise, the second polarization beam rotator 128 in second input signal path 126 can be placed in first input signal path 124 between the operator/coupler 118 and the polarization beam combiner 120.

Figure 8:
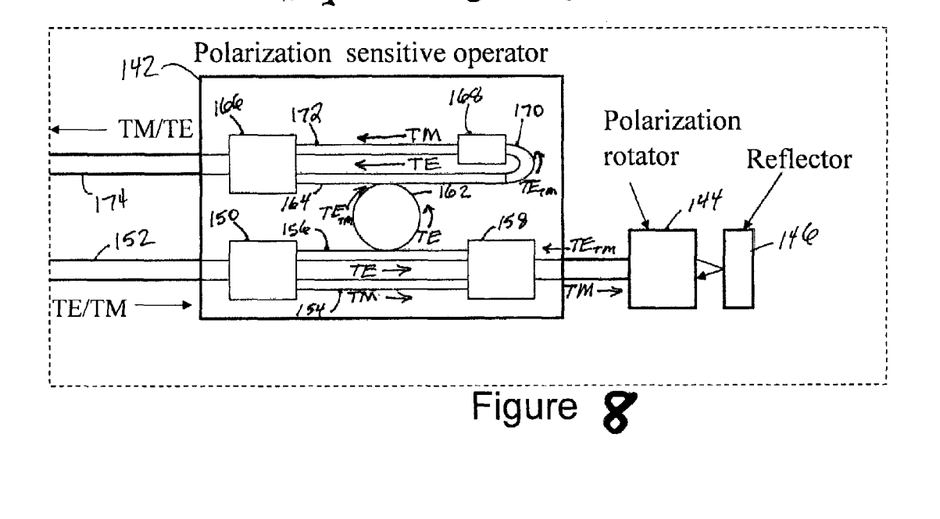
FIG. 8 is a schematic view of an embodiment of the optical circuit of FIG. 6 wherein the polarization sensitive operator comprises a polarization beam splitter, a first polarization beam combiner, an operator/coupler, a polarization rotator, and a second polarization beam combiner and the polarization rotator reflector comprises a polarization rotator and a reflector.

An alternate embodiment of the optical circuit of FIG. 6 is shown as polarization insensitive optical circuit 140 of FIG. 8 and is constructed of a polarization sensitive operator 142, a polarization rotator 144 and a reflector 146. The polarization sensitive operator 142 is similar in construction to the polarization sensitive operator 102 of optical circuit 100. The polarization sensitive operator 142 comprises a polarization beam splitter 150 having an input port 152, a first output signal path 154, and a second output signal path 156. The first output signal path 154 and second output signal path 156 are operatively connected to and serve as an input for a polarization beam combiner 158 which combines TM mode light with the portion of light in the TE mode which is non-coupled and passes the combined signal through an output/input port 160 and into the polarization rotator 144. In the polarization rotator 144 light in the TM mode is converted to the TE mode and is designated therein as $TE_{TM}$. $TE_{TM}$ and TE light which passes through the polarization rotator 144 is propagated backwardly into the polarization beam combiner 158 via reflector 146. The polarization beam combiner 158 acts as a splitter in the reverse direction and light which travels in the TE and $TE_{TM}$ modes is passed via second output signal path 156 into the operator/coupler 162 wherein the TE mode component couples into a first input signal path 164 and travels therethrough to a polarization beam combiner 166, and the $TE_{TM}$ mode component couples into the first input signal path 164 in the direction opposite of the TE mode and enters a second polarization rotator 168 via an input port 170 wherein the $TE_{TM}$ component is rotated back into a TM mode and is passed into a second input signal path 172 whereby it is input into the polarization beam combiner 166 and is output therefrom with light in the TE mode as a TM/TE signal via output port 174. Also, the polarization beam rotator 168 alternatively can be placed in first input signal path 164 between the operator/coupler 162 and the polarization beam combiner 166 instead of in the second input signal path 172.

Figure 9:
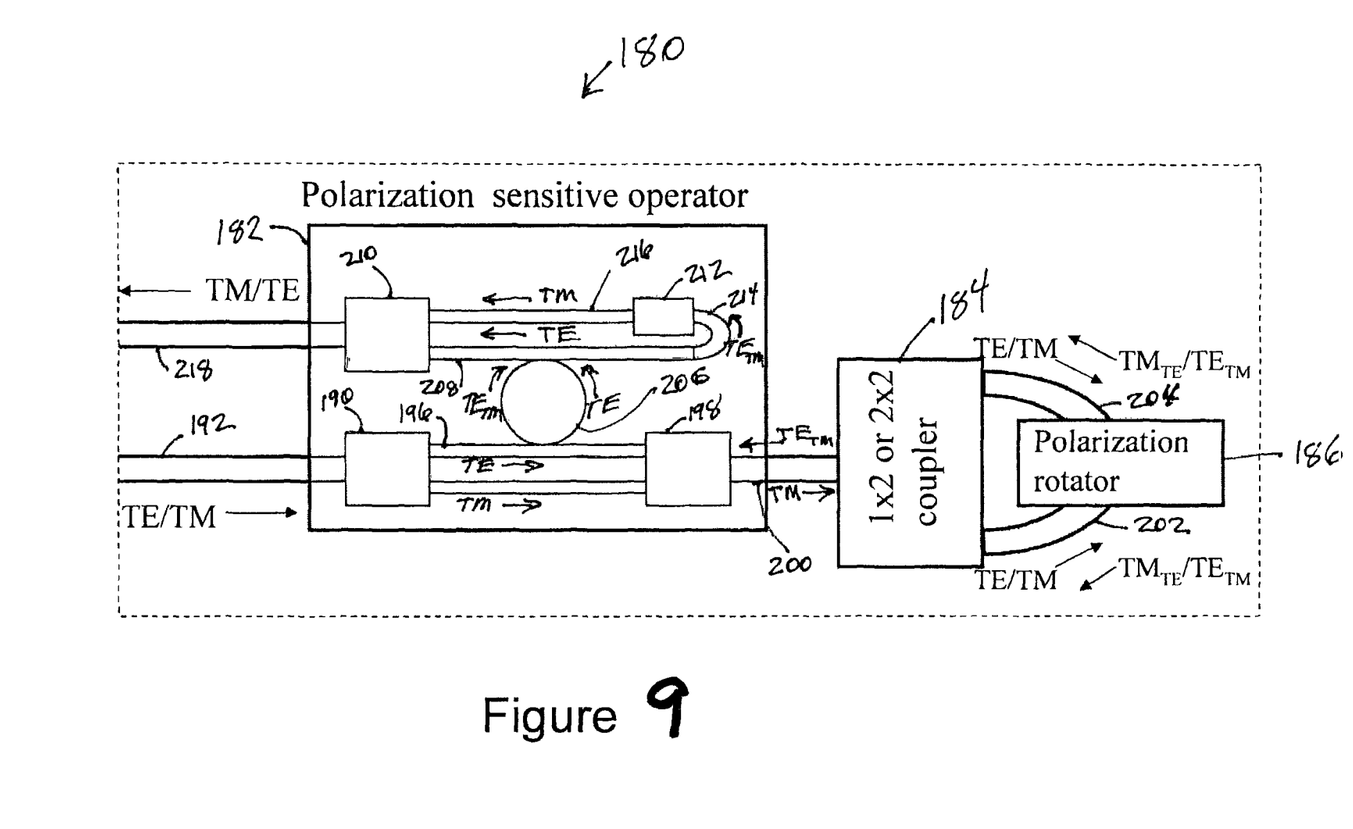
FIG. 9 is a schematic view of an embodiment of the optical circuit of FIG. 6 wherein the polarization sensitive operator comprises a polarization beam splitter, a first polarization beam combiner, an operator/coupler, a polarization rotator, and a second polarization beam combiner and the polarization rotator reflector comprises a 1×2 or 2×2 coupler and a polarization rotator.

An alternate embodiment of the optical circuit of FIG. 6 is shown as polarization insensitive optical circuit 180 of FIG. 9 and is constructed of a polarization sensitive operator 182, a 1×2 or 2×2 coupler 184, and a polarization rotator 186. The polarization sensitive operator 182 is similar in construction to the polarization sensitive operator 142 of optical circuit 140. The polarization sensitive operator 182 comprises a polarization beam splitter 190 having an input port 192, a first output signal path 194, and a second output signal path 196. The first output signal path 194 and second output signal path 196 is operatively connected to and serves as an input for a polarization beam combiner 198 which combines TM mode light with non-coupled TE light and passes the combined signal through an output/input port 200 and into the 1×2 or 2×2 coupler 184 then into the polarization rotator 186 via first port 202 and second port 204. In the polarization rotator 186 light in the TM mode is converted to the TE mode and is designated therein as $TE_{TM}$. $TE_{TM}$ light which passes through the polarization rotator 186 is returned to the polarization beam combiner 198 via the 1×2 or 2×2 coupler. The polarization beam combiner 158 acts as a splitter in the reverse direction and light which travels in the TE and $TE_{TM}$ modes is passed via second output signal path 196 into the operator/coupler 206 wherein the TE mode component couples into a first input signal path 208 and travels therethrough to a polarization beam combiner 210, and the $TE_{TM}$ mode component couples into the first input signal port 208 in the direction opposite of the TE mode and enters a second polarization rotator 212 via an input port 214. There the $TE_{TM}$ component is rotated back to a TM mode and is passed into a second input signal path 216 whereby it is input into the polarization beam combiner 210 and is output therefrom as a TM/TE signal via output port 218. Also, the polarization rotator 212 alternatively can be placed in the first input signal path 208 between the operator/coupler 206 and the polarization beam combiner 210.

In any of the embodiments of the invention contemplated herein, polarization modes designated as TE and TM, may be designated instead as TM and TE, respectively.

Although the present invention and its advantages have been described in detail, it should be understood that various changes, substitutions and alterations can be made herein without departing from the spirit and scope of the invention as defined by the appended claims. For instance the 1×2 and 2×2 couplers can be replaced more generally by other couplers such as N×M couplers. Moreover, the scope of the present application is not intended to be limited to the particular embodiments of the process, machine, manufacture, compositions of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An optical circuit, comprising:
   a polarization rotator reflector having a polarization rotator and a reflector; and
   a polarization sensitive operator comprising an operator component and having an input port, an output port, and an intermediate port, the polarization sensitive operator including:
      a polarization beam splitter having an input port, a first output port and a second output port;
      a first output signal path extending from the first output port of the polarization beam splitter;
      a second output signal path extending from the second output port of the polarization beam splitter for transmitting the optical signal to the polarization rotator reflector;
      a polarization beam combiner having an output port, a first input port and a second input port;
      a first input signal path connected to the first input port of the polarization beam combiner, and a second input signal path connected to the second input port of the polarization beam combiner;
      a second polarization rotator having an input port connected to the first input signal path and an output port connected to the second input signal path; and
      a polarization sensitive operator coupler optically coupled to the second output signal path and optically coupled to the first input signal path,
   wherein the polarization rotator reflector component is optically connected to the intermediate port of the polarization sensitive operator via the polarization sensitive operator coupler, such that the input port of the polarization sensitive operator is configured to receive an optical signal having a first polarization and supply the optical signal from the intermediate port to the first polarization rotator via polarization sensitive operator coupler, the output port of the polarization sensitive operator supplying the optical signal such that an action by the operator is substantially equalized.

2. The optical circuit of claim 1 wherein the optical signal is split by the polarization beam splitter into a TM mode component and a TE mode component, and wherein the TM mode component is transmitted to the polarization rotator reflector and rotated therein to a rotated TE mode component, wherein the rotated TE mode component is passed through the polarization sensitive operator coupler and is thereby transmitted to the second polarization rotator, wherein the rotated TE mode component is rotated into a TM signal and is transmitted therefrom to the polarization beam combiner.

3. The optical circuit of claim 2 wherein, the TE mode component passes through the polarization sensitive operator coupler and is transmitted therefrom directly to the polarization beam combiner.

4. The optical circuit of claim 1 wherein the optical signal is split by the polarization beam splitter into a TM mode component and a TE mode component, and wherein the TE mode component is transmitted to the polarization rotator reflector and rotated therein to a rotated TM mode component, wherein the rotated TM mode component is passed through the polarization sensitive operator coupler and is thereby transmitted to the second polarization rotator wherein the rotated TM mode component is rotated into a TE signal and is transmitted to the polarization beam combiner.

5. The optical circuit of claim 4 wherein, the TM mode component passes through the polarization sensitive operator coupler and is transmitted directly to the polarization beam combiner.

* * * * *